Nov. 8, 1938.　　　K. A. KUHN　　　2,135,671
DIE STOCK
Filed June 21, 1937
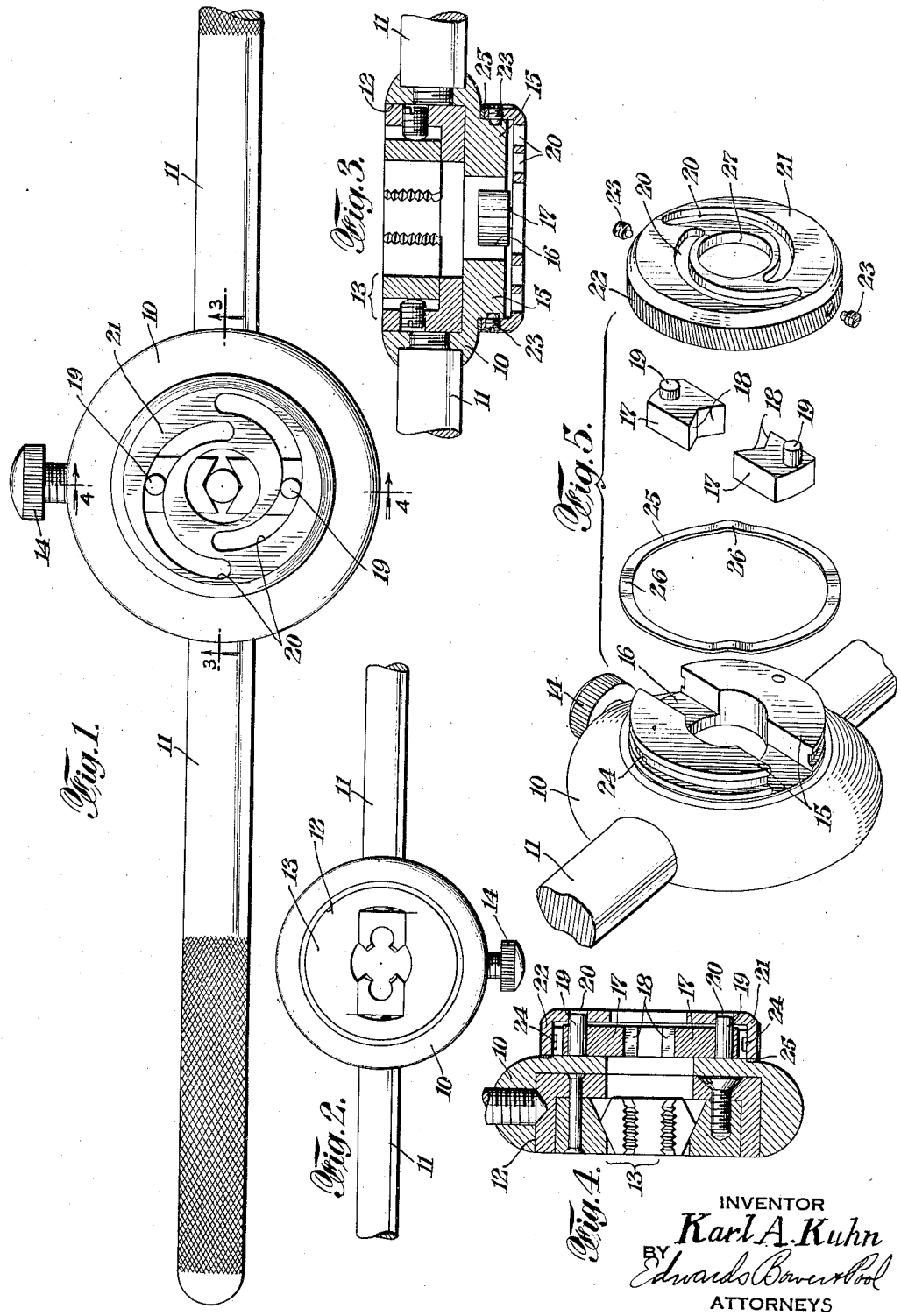
INVENTOR
Karl A. Kuhn
BY
Edwards Bower Pool
ATTORNEYS Patented Nov. 8, 1938

2,135,671

UNITED STATES PATENT OFFICE 2,135,671

DIE STOCK

Karl A. Kuhn, Greenfield, Mass., assignor to Greenfield Tap and Die Corporation, Greenfield, Mass., a corporation of Massachusetts Application June 21, 1937, Serial No. 149,426

2 Claims. (Cl. 10—127)

This invention relates to improvements in die stocks and particularly to a stock with an adjustable work guide.

The general purpose of the invention is to provide a stock of this type that is simple, strong, readily manufactured and convenient to use. The preferred form is adapted for production by automatic machines and does not require the use of castings.

Other objects and advantages will appear from the following description taken in connection with the accompanying drawing in which, Figure 1 is a plan view of the work guide face of the stock;

Figure 2 is a similar view of the die face of the stock on a smaller scale;

Figure 3 is a section on line 3—3 of Figure 1;

Figure 4 is a section on line 4—4 of Figure 1; and

Figure 5 is a perspective assembly view of the stock body and associated parts.

In the preferred form the stock comprises a body 10 having bar handles 11 mounted on opposite sides thereof. The body 10 has a smoothly curved longitudinal taper and is adapted to be formed conveniently by turning, grinding and the like on automatic machines or by other methods of production without requiring the use of castings, thereby eliminating the waste incident to occasional casting defects and permitting the employment of steels having the desired characteristics.

The body 10 is provided at one side with a circular die socket 12 adapted to receive a die 13 of any usual type held in place by set screw 14. On the opposite side from socket 12 the body 10 has a cylindrical work guide hub 15 provided with a transverse guide slot 16 in which the work guide jaws 17 are slidably mounted. Guide slot 16 extends across the work opening 27 in body 10 to form guideways for jaws 17 symmetrical with the axis of a die in socket 12.

Jaws 17 are provided at their inner ends with suitable faces for engaging opposite sides of the work, such as the right angled guide faces 18. Each guide jaw 17 has a stud 19 on its outer longitudinal face extending through a cam slot 20 in a cam cap 21 rotatably mounted on hub 15. In the form illustrated the apron 22 of the cap 21 is slidably fitted over the outer face of hub 15 and is provided with guide screws 23 fitting in guide slots 24 in hub 15. A spring washer 25 provided with offsets 26 may be positioned between the body 10 and the lower edge of the cap apron 22.

In use, a die 13 of the desired size is placed in the socket 12 and held in position by set screw 14. Guide screws 23 are adjusted to permit cap 21 to rotate on hub 15, cam slots 20 being contoured to move the work guide jaws 17 symmetrically in slot 16 relative to the axis of die 13, the guide faces 18 being parallel to such axis, assuring accurate registry of the work with the die. When the work is inserted between the jaws 17 and cap 21 is rotated to move jaws 17 into engagement with opposite sides of the work and center it accurately relative to the die, screws 23 may be tightened to maintain jaws 17 in position and assure the formation of a true, accurate thread on the work.

While various designs and arrangements are possible within the scope of the invention as defined in the claims, the preferred embodiment has been illustrated to scale to indicate desirable proportions and relationships between parts.

I claim:

1. A die stock comprising a body, handles mounted on the body, a die socket in one side of the body, an integral work guide hub on the opposite side of the body, said body, socket and hub having a circular peripheral contour transverse to the body axis suitable for production by turning, the hub comprising solid lands having arcuate peripheral faces, transverse guide channels, a central bore and continuous flat surfaces connecting said faces and bore; work guide members mounted in the channels, a cap rotatably mounted on said surfaces, and cam means on the cap operatively engaging the work guide members.

2. A die stock comprising a body, handles mounted on the body, a die socket in one side of the body, and work guiding means on the opposite side of the body, said means including radial guideways, work guide members mounted in the guideways, arcuate walls connecting the ends of the guideways, a rotatable cap having an apron overlying the arcuate walls, circumferential guide slots in said walls extending to the guideways, guide members carried by the apron extending into said slots between the guideways, and interengaging means on the guide members and cap for shifting the guide members radially upon rotation of the cap and for limiting such rotation to retain the guide members in said slots.

KARL A. KUHN.